Nov. 16, 1926.
R. D. J. B. WEBBER
1,607,416
SAFETY BRAKE HANGER
Filed Nov. 14, 1925
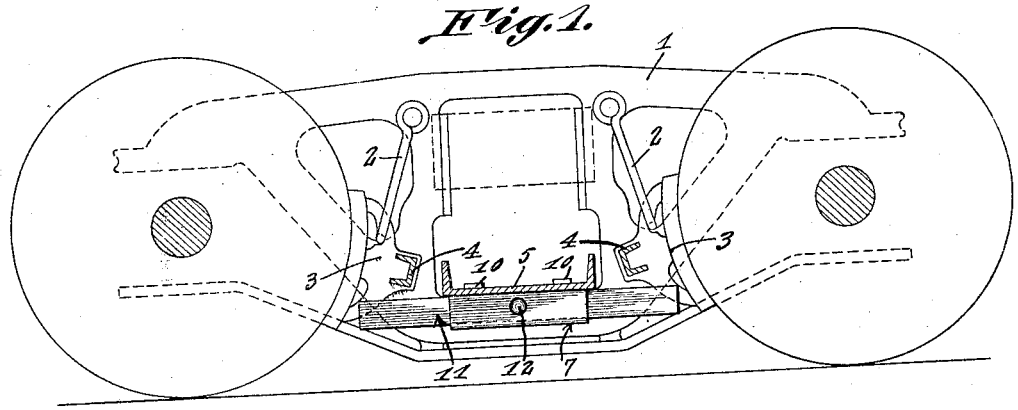
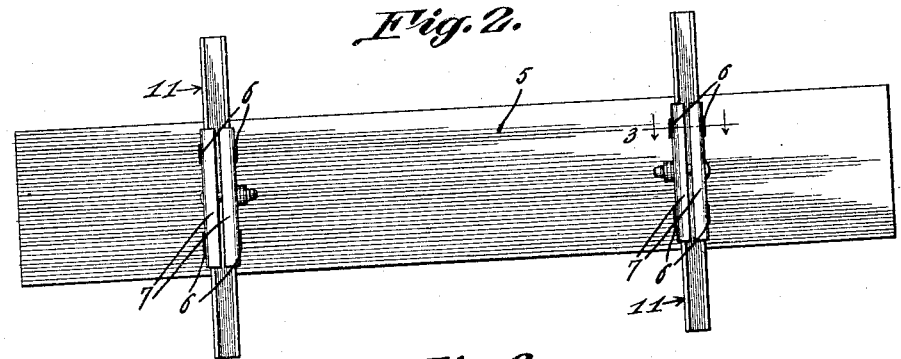
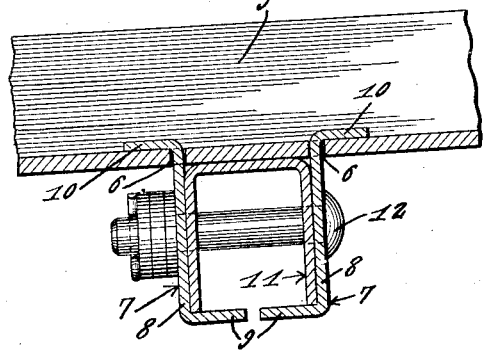
Robert D. J. Burns Webber, INVENTOR.
BY
Geo. P. Kimmel, ATTORNEY.

Patented Nov. 16, 1926.

1,607,416

UNITED STATES PATENT OFFICE.

ROBERT D. J. BURNS WEBBER, OF ALLENTOWN, PENNSYLVANIA.

SAFETY-BRAKE HANGER.

Application filed November 14, 1925. Serial No. 69,059.

This invention relates to railway car equipment and pertains particularly to an improved safety device for use upon car trucks.

The primary object of this invention is the provision, in a manner as hereinafter set forth, of a safety device mounted upon the trucks of a train car and designed to catch and support the brake beams in the event that the brake and beam support should become broken, to prevent them from falling across the track beneath the truck wheels and derailing the same.

As it is well known the brake beams which support the brake shoes, are ordinarily suspended on hangers which permit them to have the necessary swinging movement to enable the brake shoes to move against or away from the car wheels. These hangers are subject to much wear and tear and often become worn, lose or broken, in which case the brake shoe supporting beam, which extends across the truck from one side to the other, will drop across the track in front of the truck wheels, causing considerable damage if not the wreckage of the train.

In the majority of car trucks, if not in all, the side frames of the trucks are connected by a usual or commercial form of channel beam, and from this beam the safety device embodying this invention is suspended, as hereinafter set forth.

A final object of this invention is the provision, in a manner as hereinafter set forth, of a brake beam hanger safety device, which will be strong and durable, easily and quickly placed into position, or removed therefrom, and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows in longitudinal section a car truck disclosing the frame and supporting wheels upon one side thereof with the analogous structure and with the safety device embodying this invention applied thereto.

Figure 2 shows in bottom plan the brake beam hanger safety device embodying this invention and, Figure 3 is a section taken upon the line 3—3 of Figure 2.

Referring now to the drawing in detail wherein like numerals of reference indicate corresponding parts throughout the several views, there is indicated by the numeral 1 a side frame of a car truck from which by means of the hangers 2 the brake shoes 3 and brake beams 4 are suspended. As is well known these brake beams 4 extend transversely of the truck between the side frames thereof. In trucks at present in use there is found a transversely extending channel beam 5 which connects the frames 1 together between the front and rear wheels of the truck. From this channel beam the safety fixture embodying this invention is suspended.

The channel beam 5 is provided adjacent each end, and adjacent each side thereof with a pair of spaced slots 6.

Extending transversely of the beam 5 adjacent each end and beneath the slots formed therein, is a pair of supporting members 7. These members 7 are substantially L-shaped in cross section, each having a relatively deep side portion 8 and a right-angled inwardly extending flanged portion 9 along the lower edge thereof. These flanged portions 9 are in edge opposed relation as is shown in Figure 3, and the top edge of each of the side portions 8 is provided with outwardly extending tongues 10 which are adapted to extend through the slots 6 and lie upon the inner side of the channel body 5, to suspend the members therefrom in transverse opposed relation, as shown in Figure 2.

Extending transversely of the channel member 5 between the sides of the supporting members 7, and resting upon the flanges 9 thereof, is an inverted channel beam 11, the ends of which extend a substantial distance beyond the sides of the beam 5, as shown in Figure 1, beneath the brake beams 4. When the channel members 11 are in the proper position, a securing bolt 12 is passed through the sides 8 of the members 7 and through the sides of the channel beam 11 and secured, by any appropriate means, against displacement. The transverse beams 11, are thus securely held between the supporting members 7, by the bolt 12 and no movement of the beams transversely of the beam 5 can take place.

In the event of the breakage of the hanger 2, the beam 4 will drop, but it will fall upon the transverse beam 11 of the safety device and rest upon the same until replaced in position.

Applicant is aware that safety structures similar to this are well known, but the particular manner in which the safety beams 11 are supported from the underside of the transverse beam 5, is entirely new and original with applicant and it is upon this structure that applicant's claim is based.

Having thus described my invention what I claim is:—

1. A brake beam safety device comprising in combination with the side frames of a truck, a channel beam extending transversely of said truck between said frames and having a plurality of slots therethrough adjacent each end thereof, supporting hangers extending transversely of each end of said beam and having engaging tongues extending through said slots, and a safety beam extending through each hanger and underlying said brake beam.

2. A brake beam safety device comprising, in combination with the side frames of a truck, a channel beam extending transversely of said truck between said frames and having a plurality of slots therethrough adjacent each end thereof, a pair of opposed members lying transversely of the underside of said beam adjacent each end thereof, laterally extending tongues carried by each member and extended through said slots to maintain the members in position, a safety beam extending transversely of said channel beam between each pair of members and underlying said brake beams, and means for holding said safety beams in position between the members.

3. A brake beam safety device comprising, in combination with the side frames of a truck, a channel beam extending transversely of said truck between said frames and having a plurality of slots formed therethrough adjacent each end thereof, a pair of relatively long members each substantially L-shaped in cross section, extending transversely of the underside of said beam at each end and having the horizontal angled portions in edge opposed relation, tongue extensions formed along the top edge of each member and engaging in the slots in said beam, a safety beam extending between the members of each pair and resting upon said opposed flanges and further extending beneath said brake beams, and means extending through each pair of members and the associated safety beam to secure the same together.

4. A brake beam safety device, comprising a supporting hanger adapted to extend transversely of one end of the channel beam of a car truck and having tongue portions engageable through slots formed in said beam, and a safety beam extending through said hanger and underlying said brake beam.

In testimony whereof, I affix my signature hereto.

ROBERT D. J. BURNS WEBBER.